United States Patent
Knight et al.

(10) Patent No.: US 9,790,320 B2
(45) Date of Patent: Oct. 17, 2017

(54) THIOL-CURED ELASTOMERIC EPOXY RESINS

(71) Applicant: DOW GLOBAL TECHNOLOGIES LLC, Midland, MI (US)

(72) Inventors: Nicole Knight, Rosharon, TX (US); Nathan Wilmot, Missouri City, TX (US); Dwight D. Latham, Clute, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/648,644

(22) PCT Filed: Dec. 18, 2013

(86) PCT No.: PCT/US2013/076246
§ 371 (c)(1),
(2) Date: May 29, 2015

(87) PCT Pub. No.: WO2014/100245
PCT Pub. Date: Jun. 26, 2014

(65) Prior Publication Data
US 2015/0299379 A1    Oct. 22, 2015

Related U.S. Application Data

(60) Provisional application No. 61/745,524, filed on Dec. 21, 2012.

(51) Int. Cl.
| | |
|---|---|
| *C08G 59/68* | (2006.01) |
| *C08L 63/00* | (2006.01) |
| *C08G 59/06* | (2006.01) |
| *C08G 59/66* | (2006.01) |
| *C08G 59/24* | (2006.01) |
| *C09D 163/00* | (2006.01) |

(52) U.S. Cl.
CPC ......... *C08G 59/686* (2013.01); *C08G 59/066* (2013.01); *C08G 59/245* (2013.01); *C08G 59/66* (2013.01); *C08G 59/68* (2013.01); *C08L 63/00* (2013.01); *C09D 163/00* (2013.01)

(58) Field of Classification Search
CPC ......... C08G 18/58; C08G 59/66; C08L 63/00; C09D 163/00
See application file for complete search history.

(56) References Cited

U.S. PATENT DOCUMENTS

| | | | |
|---|---|---|---|
| 3,363,026 A | 1/1968 | Schroll | |
| 4,952,645 A * | 8/1990 | Mulhaupt | C08G 59/145 525/438 |
| 6,225,376 B1 | 5/2001 | Klein | |
| 2013/0211017 A1* | 8/2013 | Wilmot | C08G 59/066 525/523 |

FOREIGN PATENT DOCUMENTS

| | | |
|---|---|---|
| CA | 2788739 A | 9/2011 |
| GB | 1460571 A | 1/1977 |
| WO | 2008/140906 A | 11/2008 |
| WO | 2011/117229 A | 9/2011 |
| WO | 2012/030338 A | 3/2012 |
| WO | WO 2012030338 | * 3/2012 |

OTHER PUBLICATIONS

Senyurt, Macromolecules 2007, 40, 4901-4909.
Sangermano, Polym. Int. 2010, 59, 1045-1051.
Carioscia, Polymer 48 (2007) 1526-1532.

* cited by examiner

*Primary Examiner* — Gregory Listvoyb

(57) ABSTRACT

Elastomers are formed by curing a reaction mixture that includes an polyepoxide-terminated polyether having a linear or branched polyether chain that has a molecular weight of at least 2000, at least two epoxide groups that has an epoxide equivalent weight of at least 400 2) a curing agent containing at least one polythiol compound having at least two thiol groups and an equivalent weight per thiol group of up to 500, and 3) at least one base catalyst.

9 Claims, No Drawings

THIOL-CURED ELASTOMERIC EPOXY RESINS

This invention relates to elastomeric epoxy resins.

Elastomeric epoxy resins are described in WO 2012/030338 and WO 2012/030969. These epoxy resins are made by curing an epoxy-terminated polyether with an amine hardener. The epoxy-terminated polyether itself is made by capping the amine hydrogens of an amine-terminated polyether with an epoxy resin, to introduce terminal epoxide groups. The resulting epoxy-terminated polyether in most cases has a high functionality (i.e., number of epoxide groups per molecule). When this epoxy-terminated polyether is cured with an amine, an elastomeric material is obtained. The elastomeric material has one low (−20° C.) glass transition temperature which is attributable to the polyether, and a higher (greater than room temperature) glass transition temperature attributable to the reaction product of the amine curing agent with the epoxide groups. The two glass transition temperatures are indicative of a phase-segregated material. The epoxy-terminated polyether is made with an excess of the epoxy resin and because of this usually will contain some concentration of unreacted epoxy resin. This unreacted epoxy resin is believed to react with a portion of the amine curing agent and to become incorporated into the higher glass transition temperature phase of the elastomer.

Those elastomeric epoxy resin systems have problems of high viscosity and slow cure at ambient or slightly elevated temperature. Because of the high viscosity, it is usually necessary to heat the epoxy-terminated polyether significantly in order to reduce its viscosity enough that it can mix easily with the amine hardener at the point of application. The high viscosity is due in part to the high functionality of the epoxy-terminated polyether. The viscosity of the epoxy-terminated polyether can be reduced by reducing its functionality, but that reduces its reactivity even more. Because of those problems, the elastomeric epoxy resin systems of WO 2012/030338 and WO 2012/030969 are mainly useful in applications in which high temperature processing is acceptable.

Nonetheless, those elastomeric epoxy resin systems have certain beneficial properties such as good hydrolytic stability. Therefore, it would be desirable to provide an epoxy resin system that is processable at ambient or slightly elevated temperatures, and which nonetheless provides a cured elastomer having properties similar to those of the elastomeric epoxy resin systems of WO 2012/030338 and WO 2012/030969.

This invention is in one aspect a process for forming an elastomeric polymer, a) forming a reaction mixture containing 1) at least one polyepoxide-terminated polyether having a linear or branched polyether chain that has a molecular weight of at least 2000 g/mol, an average of at least two epoxide groups per molecule and an epoxide equivalent weight of at least 400 g/mol and 2) a curing agent containing at least one polythiol compound having at least two thiol groups and an equivalent weight per thiol group of up to 500 g/mol, and 3) at least one base catalyst and b) curing the reaction mixture to form the polymeric elastomer.

The invention provides a cured elastomeric polymer having very useful properties. The cured polymer is typically elastomeric that typically has an elongation to break of at least 50%. The cured polymer also tends to exhibit a useful tensile strength. The tensile and elongation properties can be tailored through the selection of ingredients, as described more fully below. Very significantly, the curing reaction processes very efficiently at room temperature (20° C.) or at only mildly elevated temperatures (such as up to 60° C., especially up to 50° C.). This ability to cure in reasonable times at moderate or even ambient temperatures makes the process of the invention suitable for a wide range of applications in which, for reasons of cost and/or unavailability of necessary equipment, an ambient temperature or at most moderately elevated temperature cure must be performed.

In addition, the cured elastomeric polymer typically has a phase-segregated morphology that exhibits multiple glass transition temperatures, one of which typically is 0° C. or lower and more typically −20° C. or lower.

In the present invention, the epoxy-terminated polyether is formed by the reaction of a polyether that has epoxy-reactive groups with an epoxy resin. The polyether is preferably amine terminated. Generally the polyether will have an average molecular weight of at least 3,500, preferably at least 4000, up to 30,000, preferably up to 12,000 and more preferably up to 8,000. The polyether may be a polymer of a $C_2$ to $C_8$ alkylene oxide, and is conveniently prepared by adding the alkylene oxide to an initiator having 2 to 6 active hydrogen atoms. In further embodiments, the polyether is a polymer of one or more alkylene oxides containing 2 to 4 carbon atoms, such as ethylene oxide, 1,2-propylene oxide, 1,2-butylene oxide, 2-3, butylene oxide, tetramethylene oxide, and mixtures thereof. If mixtures of alkylene oxides are used to make the polyether, the oxides may be polymerized randomly or sequentially, to form a random or block copolymer. In some embodiments the polyether is a polymer of 1,2-propylene oxide and ethylene oxide, wherein the ethylene oxide constitutes less than 30, less than 25, less than 20 or less than 15 weight percent of the weight of the oxides. In one embodiment the polyether polyol is a poly(oxypropylene) homopolymer. Catalysis for polymerization of alkylene oxide to an initiator can be either anionic or cationic. Commonly used catalysts for polymerization of alkylene oxides include KOH, CsOH, boron trifluoride, a double cyanide complex (DMC) catalyst such as zinc hexacyanocobaltate or quaternary phosphazenium compound.

Examples of commonly used initiators for forming the polyether include glycerol, trimethylol propane, sucrose, sorbitol, pentaerythritol, ethylene diamine and aminoalcohols, such as, ethanolamine, diethanolamine, and triethanolamine.

Terminal amine groups can be introduced onto the polyether by methods such as reductive amination, as described, for example in U.S. Pat. No. 3,654,370, the contents of which are incorporated by reference. Alternatively, terminal amine groups can be provided by capping the polyether with a diisocyanate to form an isocyanate-terminated prepolymer, and then hydrolyzing the terminal isocyanate groups to form terminal carbamate groups that decompose to form amine groups.

Examples of commercially available polyoxyalkyleneamines include JEFFAMINE™ D-4000 and JEFFAMINE™ T-5000 polyetheramines from Huntsman Corporation.

The epoxy resin used to make the epoxy-terminated polyether is one or more materials having an average of at least 1.5 epoxide groups per molecule and an epoxy equivalent weight of up to 1000. The epoxy equivalent weight preferably is up to 500, more preferably is up to 250 and still more preferably up to 225. The epoxy resin preferably has up to eight epoxide groups and more preferably has 1.8 to 4, especially 1.8 to 3, and most preferably 1.8 to 2.3 epoxide groups per molecule.

Among the epoxy resins useful for making the epoxy-terminated prepolymer are polyglycidyl ethers of polyphenolic compounds, by which it is meant compounds having two or more aromatic hydroxyl(phenolic) groups. One type of polyphenolic compound is a diphenol (i.e., has exactly two aromatic hydroxyl groups) such as, for example, resorcinol, catechol, hydroquinone, biphenol, bisphenol A, bisphenol AP (1,1-bis(4-hydroxylphenyl)-1-phenyl ethane), bisphenol F, bisphenol K, tetramethylbiphenol, or mixtures of two or more thereof.

Suitable polyglycidyl ethers of polyphenols include those represented by structure (I)

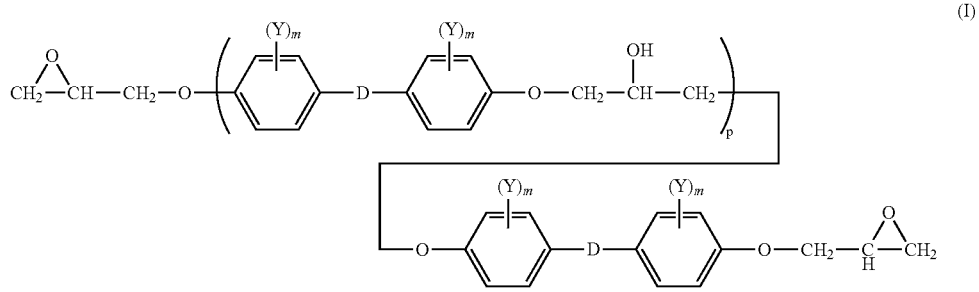

wherein each Y is independently a halogen atom, each D is a divalent hydrocarbon group suitably having from 1 to about 10, preferably from 1 to about 5, more preferably from 1 to about 3 carbon atoms, —S—, —S—S—, —SO—, —SO$_2$—, —CO$_3$— —CO— or —O—, each m is independently 0, 1, 2, 3 or 4 and p is a number such that the compound has an epoxy equivalent weight of up to 1000, preferably 170 to 250 and more preferably 170 to 225. p typically is from 0 to 1, especially from 0 to 0.5.

Fatty acid-modified polyglycidyl ethers of polyphenols, such as D.E.R.3680 from The Dow Chemical Company, are useful epoxy resins.

Other useful polyglycidyl ethers of polyphenols include epoxy novolac resins. The epoxy novolac resin can be generally described as a methylene-bridged polyphenol compound, in which some or all of the phenol groups are capped with epichlorohydrin to produce the corresponding glycidyl ether. The phenol rings may be unsubstituted, or may contain one or more substituent groups, which, if present are preferably alkyl having up to six carbon atoms and more preferably methyl. Among the suitable epoxy novolac resins are those having the general structure:

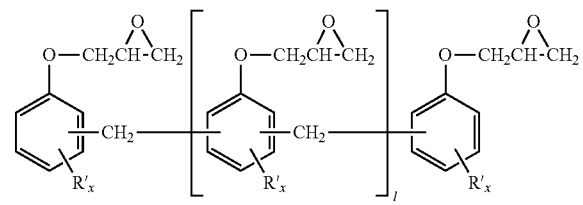

in which l is 0 to 8, preferably 1 to 4, more preferably 1 to 3, each R' is independently alkyl or inertly substituted alkyl, and each x is independently 0 to 4, preferably 0 to 2 and more preferably 0 to 1. R' is preferably methyl if present.

Other useful polyglycidyl ethers of polyphenol compounds include, for example, tris(glycidyloxyphenyl)methane, tetrakis(glycidyloxyphenyl)ethane, and the like.

Still other useful epoxy resins include polyglycidyl ethers of aliphatic polyols. These may contain 2 to 6 epoxy groups per molecule. These epoxy resins include diglycidyl ethers of alkylene glycols and polyalkylene glycols such as ethylene glycol, diethylene glycol, tripropylene glycol, 1,2-propane diol, dipropylene glycol, tripropylene glycol and the like as well as polyglycidyl ethers of higher functionality polyols such as glycerin, trimethylolpropane, trimethylolethane, pentaerythritol, sorbitol and the like.

Still other useful epoxy resins include tetraglycidyl diaminodiphenylmethane; oxazolidone-containing compounds as described in U.S. Pat. No. 5,112,932; cycloaliphatic epoxides; and advanced epoxy-isocyanate copolymers such as those sold commercially as D.E.R.™ 592 and D.E.R.™ 6508 (The Dow Chemical Company) as well as those epoxy resins described, for example, in WO 2008/140906.

It is often convenient to react an excess of the epoxy resin with the polyether. This results in a mixture of epoxy-terminated polyether and some quantity of unreacted, low equivalent weight epoxy resin.

The reaction mixture further contains at least one polythiol compound having at least two thiol groups per molecule. The polythiol preferably has an equivalent weight per thiol group of up to 500, more preferably up to 200 and still more preferably up to 150. This polythiol compound may contain up to 8, preferably up to 4 thiol groups per molecule.

Among the suitable polythiol compounds are mercaptoacetate and mercaptopropionate esters of low molecular weight polyols having 2 to 8, preferably 2 to 4 hydroxyl groups and an equivalent weight of up to about 75, in which some or all of the hydroxyl groups are esterified with the mercaptoacetate and/or mercaptopropionate. Examples of such low molecular weight polyols include, for example, ethylene glycol, diethylene glycol, triethylene glycol, 1,2-propane diol, 1,3-propane diol, dipropylene glycol, tripropylene glycol, 1,4-butane diol, 1,6-hexane diol, glycerin, trimethylolpropane, trimethylolethane, erythritol, pentaerythritol, sorbitol, sucrose and the like.

Other suitable polythiol compounds include alkylene dithiols such as 1,2-ethane dithiol, 1,2-propane dithiol, 1,3-propanedithiol, 1,4-butane dithiol, 1,6-hexane dithiol and the like, trithiols such as 1,2,3-trimercaptopropane, 1,2,3-tri(mercaptomethyl)propane, 1,2,3-tri(mercaptoethyl)ethane, (2,3-di((2-mercaptoethyl)thio)1-propanethiol, and the like. Yet another useful polythiol compound is a mercapto-substituted fatty acid having at least 2 mercapto substituents on the fatty acid chains, such as, for example, that having the structure:

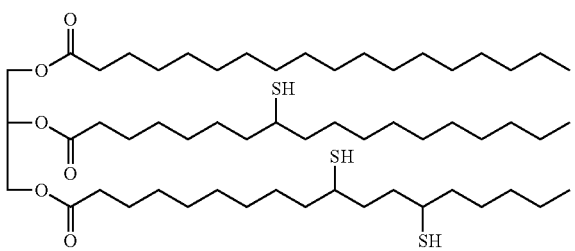 [SMILES: CCCCCCCCCCCCCCCCCC(=O)OCC(COC(=O)CCCCCCCCC(S)CCC(S)CCCCC)OC(=O)CCCCCCC(S)CCCCCCCCCC]

The amount of curing agent used can vary widely, depending on the properties that are wanted in the cured product, and in some cases depending on the type of curing reactions that are desired. The maximum amount of curing agent typically provides up to 1.25 equivalents, preferably up to 1.15 equivalents and in some cases up to 1.05 equivalents of thiol groups per equivalent of epoxy groups and any optional ene groups (as described below) as may be present. Larger excesses of the curing agent tend to degrade polymer properties. Because the epoxy resin(s) can polymerize with themselves and in many cases the optional ene compound also is capable of self-polymerization, it is possible to provide a large excess of epoxy and ene (if present) groups in the reaction mixture. Thus, for example, as few as 0.1, as few as 0.25 or as few as 0.5 equivalents of thiol groups in the curing agent can be provided per equivalent of epoxy and ene (if present) groups.

In some embodiments, the amount of curing agent is close to stoichiometric, i.e., the total number of thiol equivalents is somewhat close to the combined number of equivalents of epoxy and ene (if present) groups provided to the reaction mixture. Thus, for example, 0.75 to 1.25 equivalents, from 0.85 to 1.15 equivalents or from 0.85 to 1.05 equivalents of thiol groups can be provided by the curing agent per equivalent of epoxide and ene (if present) groups present in the reaction mixture.

The reaction mixture contains at least one basic catalyst. For purposes of this invention, a basic catalyst is a compound that is capable of directly or indirectly extracting a hydrogen from a thiol group to form a thiolate anion. In some embodiments, the basic catalyst does not contain thiol groups and/or amine hydrogens. The catalyst is preferably a material with a conjugate acid pKa of at least 5, preferably at least 10.

Among useful types of catalysts include inorganic compounds such as salts of a strong base and a weak acid, of which potassium carbonate and potassium carboxylates are examples, various amine compounds, and various phosphines.

Suitable amine catalysts include various tertiary amine compounds, cyclic amidine compounds such as 1,8-diazabicyclo-5.4.0-undecene-7, tertiary aminophenol compounds, benzyl tertiary amine compounds, imidazole compounds, or mixtures of any two or more thereof. Tertiaryaminophenol compounds contain one or more phenolic groups and one or more tertiary amino groups. Examples of tertiary aminophenol compounds include mono-, bis- and tris(dimethylaminomethyl)phenol, as well as mixtures of two or more of these. Benzyl tertiary amine compounds are compounds having a tertiary nitrogen atom, in which at least one of the substituents on the tertiary nitrogen atom is a benzyl or substituted benzyl group. An example of a useful benzyl tertiary amine compound is N,N-dimethyl benzylamine.

Imidazole compounds contain one or more imidazole groups. Examples of imidazole compounds include, for example, imidazole, 2-methylimidazole, 2-ethyl-4-methylimidazole, 2-undecylimidazole, 2-heptadecylimidazole, 2-phenylimidazole, 2-phenyl-4-methylimidazole, 1-benzyl-2-methylimidazole, 2-ethylimidazole, 2-isopropylimidazole, 2-phenyl-4-benzylimidazole, 1-cyanoethyl-2-undecylimidazole, 1-cyanoethyl-2-ethyl-4-methylimidazole, 1-cyanoethyl-2-undecylimidazole, 1-cyanoethyl-2-isopropylimidazole, 1-cyanoethyl-2-phenylimidazole, 2,4-diamino-6-[2'-methylimidazolyl-(1)']ethyl-s-triazine, 2,4-diamino-6-[2'-ethylimidazolyl-(1)']ethyl-s-triazine, 2,4-diamino-6-[2'-undecylimidazolyl-(1)']ethyl-s-triazine, 2-methylimidazolium-isocyanuric acid adduct, 2-phenylimidazolium-isocyanuric acid adduct, 1-aminoethyl-2-methylimidazole, 2-phenyl-4,5-dihydroxymethylimidazole, 2-phenyl-4-methyl-5-hydroxymethylimidazole, 2-phenyl-4-benzyl-5-hydroxymethylimidazole, and compounds containing two or more imidazole rings obtained by dehydrating any of the foregoing imidazole compounds or condensing them with formaldehyde.

Other useful catalysts include phosphine compounds, i.e., compounds having the general formula $R^3{}_3P$, wherein each $R^3$ is hydrocarbyl or inertly substituted hydrocarbyl. Dimethylphenyl phosphine, trimethyl phosphine, triethylphosphine and the like are examples of such phosphine catalysts.

The basic catalyst is present in a catalytically effective amount. A suitable amount is typically from about 0.01 to about 10 moles of catalyst per equivalent of thiol groups in the curing agent. A preferred amount is 0.05 to 1 mole of catalyst per equivalent of thiol groups in the curing agent.

In addition to the foregoing ingredients, the reaction mixture may contain various optional materials.

One useful optional ingredient is a low (less than 1000, preferably up to 500, more preferably up to 250) equivalent weight epoxy resin. The epoxy resins described above are all useful, with the polyglycidyl ethers of polyphenols, polyglycidyl ethers of aliphatic polyols, or mixtures thereof, in each case having an epoxy equivalent weight of up to 250, being preferred. The low equivalent weight epoxy resin includes any unreacted epoxy resins as may be present in the epoxy-terminated prepolymer described before, as well as any separately added low equivalent weight epoxy resin as may be otherwise added into the reaction mixture.

If present, a useful amount of the low equivalent weight epoxy resin to be provided to the reaction mixture is from 1 to 200 parts, preferably 25 to 150 parts, more preferably 35 to 125 parts and still or preferably 50 to 110 parts by weight per 100 parts by weight of the epoxy-terminated polyether or, if a high equivalent weight polyene compound (as described below) is present, per 100 parts of the combined weight of the epoxy-terminated polyether and the high equivalent weight polyene compound. The amount of epoxy resin, relative to the epoxy-terminated polyether (and high equivalent weight polyene compound(s), if present), can be varied to adjust the properties of the elastomer. The foregoing ratio has been found to provide an elastomer having a combination of high elongation (at least 50%) and good tensile strength (at least 2100 kPa (about 300 psi), preferably at least 3500 kPa (about 500 psi). Within this broad range, elongation generally decreases with an increasing amount of low equivalent weight epoxy resin while tensile strength and modulus tend to increase Another optional ingredient of the reaction mixture is a polyene compound. The polyene compound has at least two aliphatic or cycloaliphatic carbon-carbon double bonds ("ene groups") capable of engaging in a thiol-ene addition reaction.

The polyene preferably has no more than 8, more preferably no more than 6, still more preferably no more than 4, ene groups.

The ene groups are aliphatic or, less preferably, alicyclic carbon-carbon double bonds in which a hydrogen atom is bonded to at least one of the carbon atoms. The carbon-carbon double bonds can take the form:

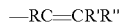

wherein R, R' and R" are independently hydrogen or an organic substituent, which organic substituent may be substituted, provided at least one of R, R' and R" is a hydrogen atom. Any of R, R' and R" may be, for example, an alkyl or substituted alkyl group having up to 12, preferably up to 4 and more preferably up to 3 carbon atoms. R is preferably hydrogen or methyl. It is preferred that R' and R" are each hydrogen and more preferred that R, R' and R" are all hydrogen.

In some embodiments, the ene groups are provided in the form of terminal α,β-unsaturated carboxylate groups, such as, for example, acrylate (—O—C(O)—CH=CH$_2$) groups or methacrylate (—O—C(O)—C(CH$_3$)=CH$_2$) groups. In some embodiments, the ene groups are terminal vinyl (—CH=CH$_2$) groups. The vinyl groups may be vinylaryl groups, in which the vinyl group is bonded directly to a ring carbon of an aromatic ring such as a phenyl ring. In some embodiments, the ene groups are terminal allyl (—CH$_2$—CH=CH$_2$) groups. The polyene compound may have ene groups of different types, or all of the ene groups can be the same.

In some embodiments the polyene compound is a high equivalent material having an equivalent weight per ene group of at least 500, preferably at least 1000, more preferably at least 1500, to about 10,000, more preferably about 6,000 and still more preferably about 4,000. In such high equivalent weight polyene compounds, it is preferred that at least one of the ene groups is spaced apart from each of the other ene groups by a flexible aliphatic spacer group having a weight of at least 500 atomic mass units. It is preferred that each of the ene groups is spaced apart from each of the others by such a flexible aliphatic spacer group. The ene groups preferably are terminal, i.e., at the ends of the molecular chains.

The spacer groups each have a weight of at least 500 atomic mass units, preferably at least 1000 atomic mass units and more preferably at least 1500 atomic mass units. The weight of the flexible spacer groups may be as much as 20,000, and preferably is up to 12,000, more preferably up to 8000.

In preferred embodiments, each of the spacer groups contains an aliphatic polyether chain, which may form all or a portion of such spacer groups. The aliphatic polyether chain that preferably has a weight of at least 500, more preferably at least 1000, still more preferably at least 1500, to as much as 20,000, preferably up 12,000 and more preferably up to 8,000. The polyether chain may be, for example, a polymer of ethylene oxide, 1,2-propylene oxide, 1,2-butylene oxide, 2,3-butylene oxide, tetramethylene oxide, and the like. It has been found that polyether chains having side groups, such as, for example, polymers of 1,2-propylene oxide, 1,2-butylene oxide, 2,3-butylene oxide and the like, provide particularly good results in forming a phase-segregated polymer having good properties. An especially preferred spacer group contains a poly(1,2-propylene oxide) chain or a random propylene oxide-co-ethylene oxide chain in which the ethylene oxide chain contains up to 40%, preferably up to 25%, more preferably up to about 15%, by weight copolymerized ethylene oxide. Such especially preferred spacer groups may have terminal poly(ethylene oxide) segments, provided that such segments should not in the aggregate constitute more than 40%, preferably not more than 25% and more preferably not more than 15% of the total weight of the polyether.

A preferred class of polyene compounds is ene-terminated polyethers. There are several approaches to making those materials. One approach involves capping the hydroxyl groups of a polyether polyol with an ene compound that also has a functional group that reacts with a hydroxyl group to form a bond to the end of the polyether chain. Examples of such capping compounds include ene-containing isocyanate compounds include, for example, 3-isopropenyl-α,α-dimethylbenzylisocyanate (TMI), 2-isocyanatoethyl methacrylate (IEM), or 2-isocyanatoethyl acrylate. Ene-terminated polyethers also can be prepared by capping a polyether polyol with an ethylenically unsaturated halide such as vinyl benzyl chloride, an ethylenically unsaturated siloxane such as vinyltrimethoxylsilane, or an ethylenically unsaturated epoxide compound.

Another approach to making an ene-terminated polyether is to cap a polyether polyol as described before with a polyisocyanate compound, preferably a diisocyanate. The polyisocyanate may be, for example, an aromatic polyisocyanate such as diphenylmethane diisocyanate or toluene diisocyanate or an aliphatic polyisocyanate such as isophorone diisocyanate, hexamethylene diisocyanate, hydrogenated toluene diisocyanate, hydrogenated diphenylmethane diisocyanate, and the like. This produces a prepolymer that contains urethane groups and terminal isocyanate groups. The isocyanate groups are then capped by reaction with an isocyanate-reactive capping compound having a hydroxyl group and an ene group as described before. Examples of such isocyanate-reactive capping compounds include, for example, allyl alcohol, vinyl alcohol and hydroxyalkylacrylate and/or hydroxyalkylmethacrylate compounds such as hydroxyethylacrylate and hydroxyethylmethacrylate.

In some embodiments, one or more low equivalent weight ene compounds is provided to the reaction mixture. Such compound(s) have one or more ene groups as described before and may have, for example, an equivalent weight per ene group of up to about 450, preferably up to about 250. Such low equivalent weight ene compounds can be produced, for example, by capping the hydroxyl groups of a low (up to 125, preferably up to 75) equivalent weight polyol with an unsaturated isocyanate compound such as 3-isopropenyl-α,α-dimethylbenzylisocyanate (TMI), 2-isocyanatoethyl methacrylate (IEM), or 2-isocyanatoethyl acrylate, an ethylenically unsaturated halide such as vinyl benzyl chloride, an ethylenically unsaturated siloxane such as vinyltrimethoxylsilane, an ethylenically unsaturated epoxide compound, or a hydroxyalkyl acrylate or methacrylate. Low equivalent weight ene compounds also can be produced by capping a polyisocyanate, preferably a diisocyanate, with an isocyanate-reactive capping compound having a hydroxyl group and an ene group as described before. Other useful low equivalent weight ene compounds include divinyl arene compound such as divinyl benzene.

In some embodiments of the invention, mixtures of high and low equivalent weight ene compounds can be produced by (1) reacting an excess of a polyisocyanate with a polyether polyol, optionally in the presence of a chain extender, to form a quasi-prepolymer containing isocyanate terminated polyether compounds unreacted (monomeric) polyisocyanates and then (2) capping the isocyanate groups with an isocyanate-reactive capping compound having a hydroxyl group and an ene group as described before. This caps the prepolymer molecules and the remaining monomeric isocyanate compounds to produce a mixture of high and low equivalent weight ene compounds.

If a high equivalent weight polyene compound is present, it preferably is present in an amount from 1 to 300 parts by weight per 100 parts by weight of the epoxy-terminated polyether. A more preferred amount is 1 to 100 parts by weight per 100 parts by weight of the epoxy terminated polyether and a still more preferred amount is 1 to 1 to 50 parts by weight.

If present, the amount of low equivalent weight polyene compound plus that of any low equivalent weight epoxy resin as may be provided to the reaction mixture may be from 1 to 200 parts, preferably 10 to 150 parts, more preferably 10 to 100 parts and still or preferably 10 to 50 parts by weight per 100 parts by weight of the epoxy-terminated polyether or, if a high equivalent weight polyene compound (as described below) is present, per 100 parts of the combined weight of the epoxy-terminated polyether and the high equivalent weight polyene compound.

If a polyene compound is present, a useful optional material is a free-radical initiator, and in particular a thermally decomposable free radical initiator that produces free radicals when heated to a temperature in the range of 50 to 160° C., especially 65 to 120° C. and more preferably 70 to 100° C. Such a thermally-decomposable free radical initiator compound may have a 10 minute half-life temperature of 50 to 120° C. The presence of a free radical initiator can permit a dual-mechanism cure to take place, in which the ene reaction with a thiol takes place via a free radical mechanism, and the epoxy cure takes place via an anionic (base-catalyzed) mechanism. Such an approach permits the ene/thiol and epoxy/thiol reactions to take place sequentially, if desired, by subjecting the reaction mixture first to conditions that promote the formation of free radicals by the free radical initiator, and then to conditions sufficient to cure the epoxy resin component. Alternatively, both curing mechanisms can occur simultaneously by, for example, selecting a heat-activated free radical initiator, and exposing the reaction mixture to an elevated temperature sufficient to activate the free radical initiator and promote the epoxy curing reaction.

Certain polyene compounds, in particular those having terminal acrylate and/or methacrylate ene groups, can homopolymerize in the presence of free radicals. Thus, in some embodiments, an excess of polyene compounds having acrylate and/or methacrylate ene groups (over the amount of thiol groups in the curing agent) can be provided in conjunction with a free radical initiator, to promote a certain amount of homopolymerization of the polyene compound in addition to the ene/thiol curing reaction. In other embodiments, the polyene compound contains, for example, vinyl and/or allyl groups, which do not homopolymerize to a significant extent under free radical conditions. In such a case, the presence of a free radical initiator may still be of benefit, as it allows for the dual cure mechanism in which the ene groups react with the thiol groups via a free radical mechanism and the epoxy cures via a base-catalyzed mechanism.

Examples of suitable free-radical generators include, for example, peroxy compounds such as peroxides, persulfates, perborates, percarbonates, azo compounds and the like. Specific examples include hydrogen peroxide, di(decanoyl) peroxide, dilauroyl peroxide, t-butyl perneodecanoate, 1,1-dimethyl-3-hydroxybutyl peroxide-2-ethyl hexanoate, di(t-butyl)peroxide, t-butylperoxydiethyl acetate, t-butyl peroctoate, t-butyl peroxy isobutyrate, t-butyl peroxy-3,5,5-trimethyl hexanoate, t-butyl perbenzoate, t-butyl peroxy pivulate, t-amyl peroxy pivalate, t-butyl peroxy-2-ethyl hexanoate, lauroyl peroxide, cumene hydroperoxide, t-butyl hydroperoxide, azo bis(isobutyronitrile), 2,2'-azo bis(2-methylbutyronitrile) and the like.

A useful amount of free-radical initiator is 0.2 to 10 parts by weight per 100 parts by weight of polyene compound(s).

The reaction mixture may contain other materials in addition to those described above. Such additional materials may include, for example, one or more colorants, one or more solvents or reactive diluents, one or more antioxidants, one or more preservatives, one or more fibers, one or more non-fibrous particulate fillers (including micron- and nano-particles), wetting agents, plasticizers, light stabilizers, tackifying agents and the like.

The reaction mixture preferably is substantially free of isocyanate compounds. Such compounds, if present at all, preferably constitute at most 1%, more preferably at most 0.5% of the weight of the reaction mixture. Most preferably the reaction mixture contains no measurable amount of isocyanate compounds.

The curing step can be performed in several ways.

In the simplest method, the starting materials are simply combined at ambient temperature and allowed to react. It is generally beneficial to combine the epoxy resin(s) with any polyene compound(s) prior to adding the curing agent(s). This mixing can be done, for example, using a high speed laboratory mixer or other suitable device.

It is often convenient to formulate the starting materials into a two-component system. The first component contains the epoxy resin(s) and any polyene compound(s) as may be present, and the second component includes the curing agent(s). The catalyst(s) can be formulated into either or both of these components, although it is generally preferred to formulate them into the curing agent to prevent premature reaction of the epoxy compounds and any polyene compounds as may be present. Other ingredients can be formulated into either or both of the components, provided such compounds do not undesirably react therewith.

The reaction mixture is then applied to a substrate and/or introduced into a mold or other container where the cure is to take place.

The curing reactions in many cases proceed at room temperature (about 20° C.), and curing can in such cases be effected without application of external energy. In such cases, the curing agent can simply be mixed with the epoxy resin(s) (and any polyene compound(s) as may be present) at ambient temperature and the resulting mixture is permitted to cure without applied heat. The curing reaction is generally exothermic, and a corresponding temperature rise may occur.

A faster and/or more complete cure often is seen at higher temperatures, and for that reason it may be desirable in some embodiments to apply heat to the reaction mixture. This can be done, for example, by (a) heating one or more of the starting materials prior to mixing it with the others to form the reaction mixture and/or (b) heating the reaction mixture after it has been formed by combining the raw materials. If an elevated temperature cure is performed, a suitable curing temperature is 35 to 180° C. A preferred curing temperature is up to 120° C. An advantage of this invention is that curing can be achieved in reasonable time frames at ambient or only slightly elevated temperatures. Thus, in some embodiments, the curing temperature is up to 60° C. or up to 50° C.

In some embodiments, curing can be supplemented by exposing the reaction mixture to free radicals and/or conditions that generate free radicals. This can be done in addition to performing an elevated temperature cure. Free radicals can be provided in various ways. In some embodiments, the reaction mixture is exposed to a light source, preferably a source of ultraviolet light such as a mercury discharge lamp or a UV-producing LED. The ultraviolet light source may provide UV radiation at an intensity of, for example, 10 mW/cm$^2$ to 10 W/cm$^2$. In other embodiments, the reaction mixture is exposed to a plasma. In still other embodiments, the free radicals are generated by the decomposition of a free radical initiator compound as described before. In the last case, free radicals can be generated thermally by exposing the reaction mixture to an elevated temperature, thereby promoting a free radical curing mechanism as well as accelerating the reaction of the epoxy resin(s) with the curing agent.

In some cases, especially when an optional polyene compound containing acrylate and/or methacrylate ene groups is present, free radical conditions also can promote a homopolymerization of the polyene compound(s). When it is desired to promote such a homopolymerization, the reaction mixture preferably includes at least one polyene compound having acrylate and/or methacrylate ene groups, and also preferably includes an excess of ene and epoxy groups, relative to the amount of curing agent, such as at least 1.25, up to as many as 10, equivalents of ene and epoxy groups per equivalent of thiol and amine (if any) groups in the curing agent. If the homopolymerization of the ene groups is not desired, it is preferred that the ene compounds are devoid of ene groups such as acrylate and methacrylate groups, which homopolymerize under free radical conditions.

The cured polymer is elastomeric. It typically has an elongation to break of at least 50%, preferably at least 75%, as determined according to ASTM D1708. Elongation to break may be as much as 1000% or more. A typical elongation is 100 to 400%, especially 100 to 250%. Tensile strength is often at least 2000 kPa (about 300 psi), in some embodiments is at least 3500 kPa (about 500 psi), and in especially preferred embodiments is at least 7000 kPa (about 1000 psi). Tensile strength may be 28000 kPa (about 4000 psi) or higher, but is more typically up to 21000 kPa (about 3000 psi) or up to 14000 kPa (about 2000 psi). The elastomer in many embodiments has a Shore A hardness of 60 to 95, more typically 70 to 95 and still more typically 70 to 90, although harder elastomers can be produced. An advantage of this invention is that properties can be tailored through the selection of starting materials, the ratios of starting materials, and to some extent the manner of cure.

The process and elastomer of the invention are very amenable for making a wide variety of coatings, adhesives, sealants and elastomeric materials such as seals and gaskets. The invention is very suitable for in-field applications, in which a coating, adhesive, sealant or elastomeric material is formed at the place of use.

The following examples are provided to illustrate the invention, but not limit the scope thereof. All parts and percentages are by weight unless otherwise indicated.

EXAMPLES 1-6

A. Production of Epoxy-Terminated Prepolymer:

49.6 kg of a 180 equivalent weight diglycidyl ether of bisphenol A (DER™ 383 liquid epoxy resin, available from The Dow Chemical Company) are mixed with a 52.3 kg of a 5000 molecular weight amine-terminated glycerin-initiated poly(propyleneoxide) (Jeffamine™ T5000, available from Huntsman Corp., amine hydrogen equivalent weight=952 g/mol). The mixture is degassed, and heated at 125° C. under nitrogen for three hours. The resulting product is a viscous liquid having a viscosity of 90,000 cPs at 25° C. and an epoxy equivalent weight of 412 g/mol. The product is a mixture contains about 70% by weight of an epoxy-terminated polyether corresponding to the reaction product of the amine-terminated polyether with the epoxy resin, and about 30% by weight of unreacted liquid epoxy resin.

B. Production of Phase-Segmented Elastomer

To produce Example 1, 21.8 g of trimethylolpropane tris(3-mercaptopropionate), 7.3 g of (2,3-di((2-mercaptoethyl)thio)1-propanethiol and 0.33 moles of DBU catalyst per mole of thiol groups are mixed on a high-speed laboratory mixer. Separately, 53.0 g of the product produced in A above is mixed with 22.7 g of an epoxy blend (Airstone 780 E, from The Dow Chemical Company) on a high-speed laboratory mixer until homogenous. The thiol/catalyst mixture is then mixed with the epoxy resin mixture to produce a clear mixture and allowed to cure at room temperature. The temperature of the reaction mixture is monitored with a thermocouple to determine the peak temperature generated by the exothermic curing reaction, as well as the time required to reach the peak exotherm temperature. The peak exotherm temperature of about 160° C. is reached after about 10 minutes.

Example 2 is prepared in the same manner, except the amount of DBU catalyst is reduced to 0.20 mole-%. Example 2 cures similarly to Example 1.

Example 3 is prepared in the same manner, except the amount of DBU catalyst is reduced to 0.15 mole-%. Example 3 cures slightly more slowly than Examples 1 and 2, and the exotherm produces a slightly lower temperature.

Example 4 is prepared in the same manner, except the amount of DBU catalyst is reduced to 0.05 mole-%. The peak exotherm temperature of about 135° C. is reached after about 65 minutes.

Example 5 is prepared in the same manner, except the catalyst is 0.15 mole-% of 1,4-diazabicyclo[2.2.2]octane. The peak exotherm temperature of about 140° C. is reached after about 30 minutes.

Example 6 is prepared in the same manner, except the catalyst is 0.05 mole-% of 1,4-diazabicyclo[2.2.2]octane. The peak exotherm temperature of about 120° C. is reached after about 80 minutes.

EXAMPLE 7

To produce Example 7, 24.6 g of trimethylolpropane tris(3-mercaptopropionate) and 0.33 moles of DBU catalyst per mole of thiol groups are mixed on a high-speed laboratory blender. Separately, 53.0 g of the product produced as in Example 1A above is mixed with 22.7 g of an epoxy blend (Airstone 780 E, from The Dow Chemical Company) on a high-speed laboratory mixer until homogenous. The thiol/catalyst mixture is then mixed with the epoxy resin mixture to produce a clear mixture, poured into a mold and allowed to cure at 50° C.

The cured plaque has a tensile strength of 10.5 MPa (about 1520 psi), an elongation at break of 76% (as measured per ASTM D1708), a tensile modulus of 91.2 MPa (about 13200 psi), and a Shore A hardness of 72. A 10 mg sample of the cured plaque is evaluated by differential scanning calorimetry by equilibrating the sample at −90° C. and heating to 200° C. at the rate of 10° C./minute. Two glass transition temperatures are elicited, one at about −58° C. and a second one at about 37° C.

EXAMPLE 8

To produce Example 8, 16.5 g of trimethylolpropane trimercaptopropionate and 0.33 moles of DBU catalyst per mole of thiol groups are mixed on a high-speed laboratory blender. Separately, a portion of the product produced in Example 1A above is blended with a 180 equivalent weight diglycidyl ether of bisphenol A and a diglycidyl ether of 1,4-butane diol at a weight ratio of 72.5:22.5:5.0 to from a blend having a viscosity of 30,000 cPs at 25° C. The epoxy resin mixture and the trimethyolpropane trimercaptopropionate/catalyst mixture are blended at room temperature at a ratio of 2:1, and cured at 50° C. to form a plaque. The cured plaque has a tensile strength of 9.65 MPa (about 1400 psi) and an elongation at break of 155% (as measured per ASTM D1708), a tensile modulus of 33.2 MPa (about 4820 psi), and a Shore A hardness of 88. A 10 mg sample of the cured plaque is evaluated by differential scanning calorimetry by equilibrating the sample at −90° C. and heating to 200° C. at the rate of 10° C./minute. Two glass transition temperatures are elicited, one at about −58° C. and a second one at about 28° C.

EXAMPLE 9

To produce Example 9, 15.2 g of trimethylolpropane tris(3-mercaptopropionate) and 0.33 moles of DBU catalyst per mole of thiol groups are mixed on a high-speed laboratory blender. Separately, 24.4 g of the product produced in Example 1A above is mixed with 10.4 g of an epoxy blend (Airstone 780 E, from The Dow Chemical Company) on a high-speed laboratory mixer until homogenous to from a blend having a viscosity of 31,000 cPs at 25° C. The trimethyolpropane trimercaptopropionate/catalyst mixture is combined at room temperature with the epoxy resin mixture, poured into a mold and allowed to cure at 50° C.

The cured plaque has a tensile strength of 7.65 MPa (about 1110 psi), an elongation at break of 110% (as measured per ASTM D1708), a tensile modulus of 28.7 MPa (about 4160 psi), and a Shore A hardness of 86. A 10 mg sample of the cured plaque is evaluated by differential scanning calorimetry by equilibrating the sample at −90° C. and heating to 200° C. at the rate of 10° C./minute. Two glass transition temperatures are elicited, one at about −55° C. and a second one at about 28° C.

EXAMPLE 10

To produce Example 9, 10.0 g of trimethylolpropane tris(3-mercaptopropionate), 3.3 g of 1,2-Bis[(2-mercaptoethyl)thio]-3-mercaptopropane and 0.33 moles of DBU catalyst per mole of thiol groups are mixed on a high-speed laboratory blender. Separately, 24.4 g of the product produced in Example 1A above is mixed with 10.4 g of an epoxy blend (Airstone 780 E, from The Dow Chemical Company) on a high-speed laboratory mixer until homogenous to from a blend having a viscosity of 31,000 cPs at 25° C. The trimethyolpropane trimercaptopropionate/catalyst mixture is combined at room temperature with the epoxy resin mixture, poured into a mold and allowed to cure at 50° C.

The cured plaque has a tensile strength of 7650 kPa (about 1110 psi), an elongation at break of 110% (as measured per ASTM D1708), a tensile modulus of 28680 kPa (about 4160 psi), and a Shore A hardness of 87.

What is claimed is:

1. A process for forming a phase-segregated elastomeric polymer, a) forming a reaction mixture containing 1) at least one polyepoxide-terminated polyether having a linear or branched polyether chain that has a molecular weight of at least 2000 and an epoxide equivalent weight of at least 400, which polyepoxide-terminated polyether is formed by the reaction of a polyether that has epoxy-reactive groups and an average molecular weight of 4,000 to 8,000 with an epoxy resin, 2) a curing agent containing at least one polythiol compound having at least two thiol groups and an equivalent weight per thiol group of up to 500, 3) at least one base catalyst and 4) from 10 to 150 parts by weight, per 100 parts by weight of component 1), of an epoxy resin having an average of at least 1.5 epoxide groups per molecule and an epoxy equivalent weight of up to 250 and b) curing the reaction mixture at a temperature up to 60° C. to form the phase-segregated elastomeric polymer that exhibits multiple glass transition temperatures, one of which is −20° C. or lower.

2. The process of claim 1, wherein the epoxy resin 4) includes a polyglycidyl ether of a polyphenol.

3. The process of claim 2, wherein the epoxy resin 4) includes an aliphatic epoxy resin having an epoxide equivalent weight of up to 250.

4. The process of claim 3 wherein from 0.1 to 1.5 equivalents of thiol groups are provided per equivalent of epoxy groups.

5. The process of claim 3, wherein the reaction mixture further contains from 10 to 150 parts by weight, per 100 parts by weight of component 1), of 5) a polyene compound having at least two carbon-carbon double bonds capable of engaging in a thiol-ene reaction and which has a weight of up to 250 per such carbon-carbon double bond.

6. The process of claim 1, wherein the polyether is a poly(oxypropylene) homopolymer or a copolymer of 1,2-propylene oxide and ethylene oxide wherein the ethylene oxide constitutes less than 20 weight percent of the weight of the oxides.

7. The process of claim 1, wherein the reaction mixture is cured at ambient temperature.

8. The process of claim 1 wherein the polymeric elastomer has an elongation to break of at least 50% and a Shore A hardness of 60 to 95.

9. The process of claim 5 wherein the polymeric elastomer has an elongation to break of at least 50% and a Shore A hardness of 60 to 95.

* * * * *